Nov. 17, 1925.

J. J. KENNEBECK 1,561,860

OPTICAL INSTRUMENT AND LENS

Filed July 27, 1922

Witness:
R. E. Hamilton

Inventor,
Joseph J. Kennebeck,
By Thorpe & Gerard
attys

Patented Nov. 17, 1925.

1,561,860

UNITED STATES PATENT OFFICE.

JOSEPH J. KENNEBECK, OF KANSAS CITY, MISSOURI.

OPTICAL INSTRUMENT AND LENS.

Application filed July 27, 1922. Serial No. 577,910.

*To all whom it may concern:*

Be it known that I, JOSEPH J. KENNEBECK, a citizen of the United States, residing at Kansas City, in the county of Jackson and State of Missouri, have invented a certain new and useful Improvement in Optical Instruments and Lenses, of which the following is a complete specification.

This invention relates to optical instruments and has for its object to produce mounting means whereby a pair of similar lenses, cylindrical plus (convex) or minus (concave), or spherical plus (convex) or minus (concave), may be mounted so as to bear a sliding relation to each other and in such a manner that the power of the combined lenses may be varied, for example, from plano to any required number of dioptrics or fraction thereof.

The prime object of the invention is to produce means for testing the eyes for the fitting of glasses, but the invention contemplates the use of the instrument in any field where it is found desirable to vary the power of the lenses for different classes of work.

The present practice in the optical field in the testing of the eyes of a patient is to fit the patient with a pair of special frames formed with lens receiving guides, and then to change the lenses of varying power before the eyes until the vision of the patient is properly corrected.

With the device of the invention it will be unnecessary for the optician to make use of a plurality of lenses necessitating the change of lenses before the eye, as will be readily understood.

Another object of the invention is to produce a lens so ground as to have a continuously varying power or focal length, from plano, for example, or other point progressively increasing in strength to any desired degree.

With the objects named in view, the invention consists in certain novel and useful features of construction and organization of parts as hereinafter described and claimed; and in order that it may be fully understood, reference is to be had to the accompanying drawing, in which:—

Figure 1:
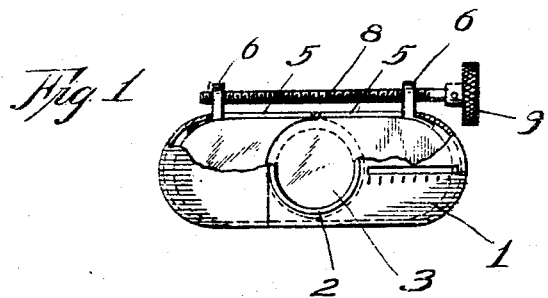
Figure 1 is a side elevation, partly broken away to illustrate parts otherwise hidden.
Figure 2:
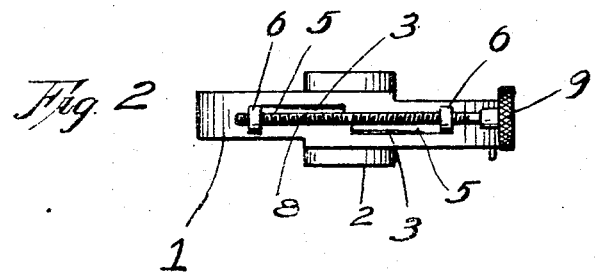
Figure 2 is a top plan view of the same.
Figure 3:
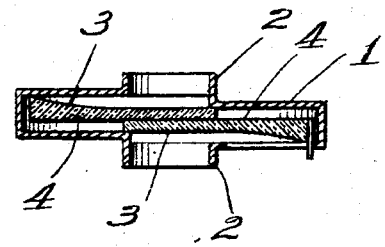
Figure 3 is a section on the line III—III of Figure 1.
Figure 4:
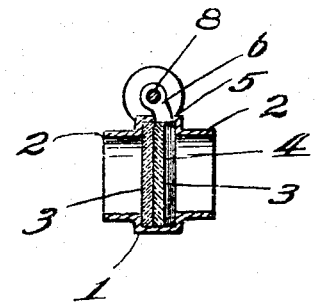
Figure 4 is a section on the line IV—IV of Figure 1.

In the said drawing, where like reference characters identify corresponding parts in all of the figures, 1 illustrates a casing of any suitable material, size and shape, depending upon the nature of the lenses adapted to be used in conjunction therewith as will hereinafter appear, and said casing is provided centrally of its opposite sides with sight openings 2 providing an aperture for the lenses.

Mounted within the casing in any suitable manner and free for sliding movement therein are a pair of duplicate lenses 5, each formed with a flat side 4, said flat sides being adapted to be juxtaposed one to the other, the opposite sides of the lenses being ground, as illustrated, for example, from plano to any desired power. It will be apparent from the arrangement and grinding of the lenses just described, that upon sliding the lenses transversely, the combined power will be increased, and also that as the lenses are duplicate the power will be the same no matter at what point across the eye opening, the view is taken.

In order to provide convenient means whereby the lenses may be simultaneously and accurately moved any desired distance within the range of the instrument, a pair of slots 5 are formed in the upper side of the casing. Secured to the rear end of each of the lenses is a finger 6 adapted for projecting through the slots 5. Each of the fingers 6 is provided with a threaded opening at its upper end in engagement with an oppositely threaded shaft 8 provided at one end of its ends with a head 9 for convenience of operation. It will be apparent that with the construction just described, the lenses 5 may be shifted in either direction equal distances simultaneously, to either increase or diminish the refracting power desired.

For some characters of work it may be found desirable to secure a gage 10 to the rear end of one of the lenses, said gage projecting through a slot 11 in the side wall of the casing and being adapted to register with a scale 12 calibrated in dioptrics to form a diopter, as will be readily understood, or, of course, the calibration can be made in any desired units.

It will be apparent from the above description that the essence of the invention lies in a pair of oppositely moving lenses of similar character, so arranged that by movement of the lenses the power of the two combined may be increased or diminished within any desired limits.

It is also to be understood, as intimated as one of the objects of the invention, that in order to produce a device of the character described, it is necessary that an entirely new and novel lens be produced, namely, a lens progressively increasing in curvature and, therefore in power from plano, or other point, to any desired degree. The exact method used in producing a lens of this character is immaterial to the invention, but it will be evident that one method is to produce a tool having the desired progressively increasing curve and then grinding a lens by imparting a straight reciprocating movement to a block of glass across the face of the tool in a direction parallel to its plano meridian.

From the above description, it will be apparent that while I have described and claimed the preferred embodiment of the invention, it is to be understood that I reserve the right to all changes properly falling within the spirit and scope of the appended claims.

I claim:—

1. A guide having an aperture, a pair of duplicate lenses mounted in said guide, said lenses and aperture being so adjustably related that the combined power of the lenses when viewed through the aperture can be varied in one sign only from plano to the initial power of the lenses.

2. A guide having an aperture, a pair of duplicate lenses mounted for simultaneous oppositely sliding movement, whereby the combined power of the lenses when viewed through the aperture can be varied in one sign only from plano to the initial power of the lenses.

3. A guide having an aperture, a pair of duplicate lenses mounted in said guide, said lenses and aperture being so adjustably related that the combined power of the lenses when viewed through the aperture can be varied in one sign only from plano to the initial power of the lenses, and means to vary the relative relation between the lenses and aperture.

4. A guide having an aperture, a pair of duplicate lenses mounted in said guide, said lenses and aperture being so adjustably related that the combined power of the lenses when viewed through the aperture can be varied in one sign only from plano to the initial power of the lenses, means to vary the relative relation between the lenses and aperture, and a gage for indicating the power of the aperture of the combined lenses in any position of adjustment.

5. A guide having an aperture, a pair of duplicate lenses mounted for simultaneous oppositely sliding movement in said guide, whereby the combined power of the lenses when viewed through the aperture can be varied in one sign only from plano to the initial power of the lenses, means for sliding said lenses, and a gage for indicating the power of the aperture of the combined lenses.

6. A pair of duplicate lenses, each having one curved side progressively changing in focal length, and means for simultaneously sliding said lenses to increase or diminish the power of the combined lenses in one sign only.

7. A guide, a pair of duplicate lenses mounted for simultaneous oppositely sliding movement in said guide, means for moving said lenses, and a gage for indicating the power of the combined lenses, one meridian remaining unchanged.

8. A guide having an aperture, a pair of duplicate lenses mounted in said guide, said lenses and aperture being so adjustably related that the combined power of the lenses when viewed through the aperture can be varied within predetermined limits in one sign only.

9. A guide having an aperture, a pair of duplicate lenses each having a flat side, said lenses being arranged with their flat sides in proximity for sliding movement in said guide; the guide aperture and the lenses being so adjustably related that the combined power of the lenses when viewed through the aperture can be varied within predetermined limits in one sign only.

In witness whereof I hereunto affix my signature.

JOSEPH J. KENNEBECK.